(12) United States Patent
Kautge et al.

(10) Patent No.: US 11,855,678 B2
(45) Date of Patent: Dec. 26, 2023

(54) METHOD FOR AMPLIFYING RADIO SIGNALS BETWEEN A TERMINAL DEVICE AND AN ANTENNA IN A FIRST FREQUENCY BAND AND IN A SECOND FREQUENCY BAND

(71) Applicant: MOLEX CVS DABENDORF GMBH, Dabendorf (DE)

(72) Inventors: Helmut Kautge, Stahnsdorf (DE); Lars Lehmann, Wildau (DE); Marcus Weigelt, Zossen (DE)

(73) Assignee: MOLEX CVS DABENDORF GMBH, Dabendorf (DE)

( * ) Notice: Subject to any disclaimer, the term of this patent is extended or adjusted under 35 U.S.C. 154(b) by 857 days.

(21) Appl. No.: 16/761,801

(22) PCT Filed: Oct. 17, 2018

(86) PCT No.: PCT/EP2018/078404
§ 371 (c)(1),
(2) Date: May 6, 2020

(87) PCT Pub. No.: WO2019/086248
PCT Pub. Date: May 9, 2019

(65) Prior Publication Data
US 2023/0134863 A1    May 4, 2023

(30) Foreign Application Priority Data

Nov. 6, 2017 (DE) .......................... 102017219685.8

(51) Int. Cl.
*H04B 1/44* (2006.01)
*H04B 1/00* (2006.01)
*H04L 5/14* (2006.01)

(52) U.S. Cl.
CPC ............... *H04B 1/44* (2013.01); *H04B 1/006* (2013.01); *H04L 5/14* (2013.01)

(58) Field of Classification Search
CPC . H04B 1/02; H04B 1/04; H04B 1/005; H04B 1/0053; H04B 1/006; H04B 1/0067;
(Continued)

(56) References Cited

U.S. PATENT DOCUMENTS 6,751,470 B1   6/2004 Ellae et al.
7,948,924 B2 * 5/2011 Seo .......................... H04B 1/48
                                                                370/294
(Continued)

FOREIGN PATENT DOCUMENTS

CN    1237866 A    12/1999
CN    1747343 A    3/2006
(Continued)

OTHER PUBLICATIONS

Notice of Allowance received for CN Application No. 201880064203.3, dated Sep. 28, 2021, 07 Pages (03 Pages of English Translation and 04 Pages of Official notification).
(Continued)

*Primary Examiner* — Quochien B Vuong

(57) ABSTRACT

Amplification of received signals in the first and second frequency bands is activated in the absence of a transmission signal in the circuit arrangement in both the first frequency band and the second frequency band. In response to a detection of a transmission signal in the circuit arrangement, the detected transmission signal is checked as to whether the detected transmission signal can be unambiguously assigned to the first frequency band or the second frequency band. If the check reveals that the detected transmission signal cannot be unambiguously assigned to the first frequency band or the second frequency band, a first transmission
(Continued)

amplifier path for amplifying the transmission signal in the first frequency band and a first receiving amplifier path for amplifying received signals in the first frequency band are activated.

13 Claims, 5 Drawing Sheets

(58) Field of Classification Search
CPC .. H04B 1/40; H04B 1/44; H04B 1/401; H04L 5/14; H04L 5/1415; H04L 5/143; H04L 5/22

See application file for complete search history.

(56) References Cited

U.S. PATENT DOCUMENTS

| | | | | |
|---|---|---|---|---|
| 8,417,286 | B2* | 4/2013 | Gorbachov | H04B 1/0064 |
| | | | | 455/90.3 |
| 9,197,332 | B2* | 11/2015 | Desai | H04B 15/00 |
| 10,069,618 | B2* | 9/2018 | Khlat | H04L 5/26 |
| 10,419,039 | B2* | 9/2019 | Hanaoka | H04B 1/50 |
| 2002/0090974 | A1 | 7/2002 | Hagn | |
| 2006/0194550 | A1 | 8/2006 | Block et al. | |
| 2008/0037507 | A1 | 2/2008 | Fukumoto et al. | |
| 2009/0207764 | A1 | 8/2009 | Fukamachi et al. | |
| 2010/0265852 | A1 | 10/2010 | Tikka et al. | |
| 2011/0117862 | A1 | 5/2011 | Bagger et al. | |
| 2014/0321339 | A1 | 10/2014 | Pehlke | |

FOREIGN PATENT DOCUMENTS

| | | |
|---|---|---|
| CN | 1922795 A | 2/2007 |
| CN | 101971511 A | 2/2011 |
| CN | 102064848 A | 5/2011 |
| CN | 106160756 A | 11/2016 |
| CN | 106575976 A | 4/2017 |
| DE | 10 2006 010963 A1 | 9/2007 |
| DE | 10 2012 113158 A1 | 7/2014 |
| EP | 1633055 A2 | 3/2006 |
| WO | 9744653 A1 | 11/1997 |
| WO | 2019/086248 A1 | 5/2019 |

OTHER PUBLICATIONS

International search report and written opinion received for PCT application No. PCT/EP2018/078404, dated Jan. 4, 2019, 19 pages. (9 pages of english translation and 10 pages of original copy).

* cited by examiner

METHOD FOR AMPLIFYING RADIO SIGNALS BETWEEN A TERMINAL DEVICE AND AN ANTENNA IN A FIRST FREQUENCY BAND AND IN A SECOND FREQUENCY BAND

RELATED APPLICATION

This application claims priority to PCT Application No. PCT/EP2018/078404, filed on Oct. 17, 2018, which is incorporated herein by reference in its entirety and which further claims priority to German Application No. 102017219685.8, filed on Nov. 6, 2017.

TECHNICAL FIELD

The present disclosure relates to a method for amplifying radio signals between a terminal device and an antenna in a first frequency band and in a second frequency band, and to a circuit arrangement for carrying out such a method.

BACKGROUND

With regard to radio signals transmitted and received by a radio device located in a motor vehicle, such as a mobile telephone, a smart phone, or an emergency transmitter (hereinafter "mobile radio device"), the body of a motor vehicle acts as a "Faraday cage", that is to say it blocks the radio signals. Transmission and received signals of the mobile radio device are thereby attenuated, wherein even the use of the mobile radio device in the vehicle may no longer be possible in some circumstances.

It is therefore advantageous to couple the mobile radio device to an external antenna of the vehicle via an antenna structure during use in the vehicle and to compensate for the resulting losses in order to enable safe operation despite the blocking effect of the vehicle body on the one hand and to keep the radiation occurring during operation of the mobile radio device away from the interior of the vehicle on the other hand. For this purpose, a corresponding amplifier device has a plurality of individually switchable amplifier paths for amplifying radio signals in different frequency bands, which amplifier paths are usually used for uplink and downlink transmissions in mobile radio systems.

Mobile terminal devices, such as mobile phones or smart phones, typically support a variety of different frequency ranges and communication standards, such as Global System for Mobile Communications (GSM), Universal Mobile Telecommunications System (UMTS), Long Term Evolution (LTE), etc., which use different transmission methods. In order to be able to provide reliable operation when using different communication standards and/or different frequency ranges, a circuit arrangement for amplifying radio signals between a terminal device and an antenna must support these different standards and/or frequency ranges and must in particular be multiband-capable. For example, such a circuit arrangement must provide amplifiers specifically adapted to the different frequency ranges. However, since one or more activated amplifiers for a frequency range may interfere with the frequency range of one or more other amplifiers, it is customary to amplify only the frequency range currently used by the terminal device. On the other hand, the amplifiers of the currently unused frequency ranges are generally not activated in order to avoid mutual interference and to reduce the power consumption of the circuit arrangement.

The increasing number of radio applications and mobile radio bands results in congestion of the frequency spectrum, as a result of which the useful frequency ranges are moving closer and closer together. For example, new mobile radio bands are allocated in existing frequency gaps between existing mobile radio bands so that the new mobile radio bands directly adjoin existing mobile radio bands.

In the boundary area of two adjacent mobile radio bands, a spectral area of overlap is formed by the frequency band-specific bandpass filters available on the market. With known detection methods, there is often the problem that the respective active mobile radio band cannot be determined unambiguously on the basis of a power of a radio signal (i.e., a signal level) measured in the area of overlap. Consequently, it is thus also not possible to determine unambiguously which amplifier paths are to be activated or switched in the amplifier device in order to achieve optimal amplification of the radio signal.

Thus, improved methods for amplifying radio signals between a terminal device and an antenna as well as corresponding circuit arrangements for performing such a method, which methods and arrangements overcome the problems and disadvantages described above, are desirable. Especially desirable are corresponding improved methods and circuit arrangements which support optimal operation even in the case of directly adjacent or overlapping frequency bands.

SUMMARY

Starting from the problems outlined above, the current disclosure is for providing a method for operating a circuit arrangement for amplifying radio signals between a terminal device and an antenna in a first frequency band and in a second frequency band. In this case, the first frequency band provides signal transmission according to a frequency division duplex (FDD) method, and the second frequency band provides signal transmission according to a time division duplex (TDD) method. According to the method, amplification of received signals in the first and second frequency bands is activated in the absence of a transmission signal in the circuit arrangement in both the first frequency band and the second frequency band. In response to a detection of a transmission signal in the circuit arrangement, the detected transmission signal is checked as to whether the detected transmission signal can be unambiguously assigned to the first frequency band or the second frequency band. If the check reveals that the detected transmission signal cannot be unambiguously assigned to the first frequency band or the second frequency band, a first transmission amplifier path for amplifying the transmission signal in the first frequency band and a first receiving amplifier path for amplifying received signals in the first frequency band are activated.

The method described above makes it possible to support optimal operation even in the case of directly adjacent or overlapping frequency bands. According to the disclosure, both full-duplex operation for the FDD band and half-duplex operation for the TDD band are supported.

In an advantageous embodiment, in the event that the check reveals that the detected transmission signal cannot be unambiguously assigned to the first frequency band or the second frequency band, a second transmission amplifier path for amplifying the transmission signal in the second frequency band is deactivated. If the second transmission amplifier path was already deactivated, it remains deactivated. This ensures that only the amplifier paths for the first frequency band are active. If the detected transmission signal is a TDD transmission signal, it is likewise supported and amplified by activating the first transmission amplifier path for amplifying the FDD band. Simultaneous activation of both transmission amplifier paths and of the receiving amplifier path of the FDD band would result in higher circuit complexity and would lead to interference in the transmission direction in the area of overlap of the bandpass filters used in the form of destructive and constructive superpositions of the transmission signal.

In a further advantageous embodiment, the first and second frequency bands are adjacent or overlapping frequency bands of the mobile radio network. 2 In these cases, the proposed method is particularly suitable for ensuring optimal operation of a corresponding circuit arrangement.

In a further advantageous embodiment, checking whether the detected transmission signal can be unambiguously assigned to the first frequency band or the second frequency band includes determining whether a detected signal level in one of the frequency bands is above a predetermined threshold value, and/or whether the detected signal level in one of the frequency bands is above the detected signal level in the other frequency band by a predetermined value.

In a further advantageous embodiment, if the check reveals that the detected transmission signal can be unambiguously assigned to the first frequency band or the second frequency band, either the first transmission amplifier path or the second transmission amplifier path are activated, and the other transmission amplifier path is deactivated.

In a further advantageous embodiment, if the transmission signal can be unambiguously assigned to the first frequency band or the second frequency band based on a time duration and/or a period duration of the transmission signal, the corresponding transmission and/or receiving amplifier path is/are activated.

In a further advantageous embodiment, the first transmission and receiving amplifier paths are activated if a time duration of the transmission signal exceeds a predetermined duration threshold value.

In a further advantageous embodiment, each of the transmission amplifier paths contains at least one transmission amplifier, and/or each of the receiving amplifier paths contains at least one receiving amplifier.

In a further advantageous embodiment, a portion of the detected transmission signal is coupled out and transmitted to a detector unit.

In a further advantageous embodiment, a signal recognized by the detector unit is supplied to a control unit.

In a further advantageous embodiment, the detector unit provides, at least for the first frequency band and the second frequency band, a corresponding first and a corresponding second detector path, each detector path comprising one or more bandpass filters configured to filter signals in the respective frequency band.

In a further advantageous embodiment, the transmission signals are transmitted by a user terminal device, and the received signals are received by an antenna unit.

In a further advantageous embodiment, the transmission signals and the received signals are each divided by means of a diplexer, a coupler, or a switch before amplification by a respective amplifier path.

In order to achieve the aforementioned goal, the present disclosure moreover provides a corresponding circuit arrangement for amplifying radio signals between a terminal device and an antenna in a first frequency band and in a second frequency band. The device comprises means for carrying out the method described above.

Both the above general description and the detailed description are to be considered as an example and are to be used for explaining the disclosure claimed. Other advantages and features of the disclosure are apparent from the following description, drawings, and claims.

BRIEF DESCRIPTION OF THE DRAWINGS

The features of the disclosure are explained in more detail in the appended claims. The disclosure itself, however, is best understood by reference to the following detailed description, which describes an exemplary embodiment of the disclosure with reference to the drawings. In the drawings:

DETAILED DESCRIPTION OF THE PREFERRED EMBODIMENTS

The accompanying drawings, the technical content and the detailed description relate to a preferred embodiment of the disclosure, which is however not to be considered as a limitation of the subject matter of the disclosure. Hereinafter, the disclosure is described in detail with reference to the drawings.

Figure 1:
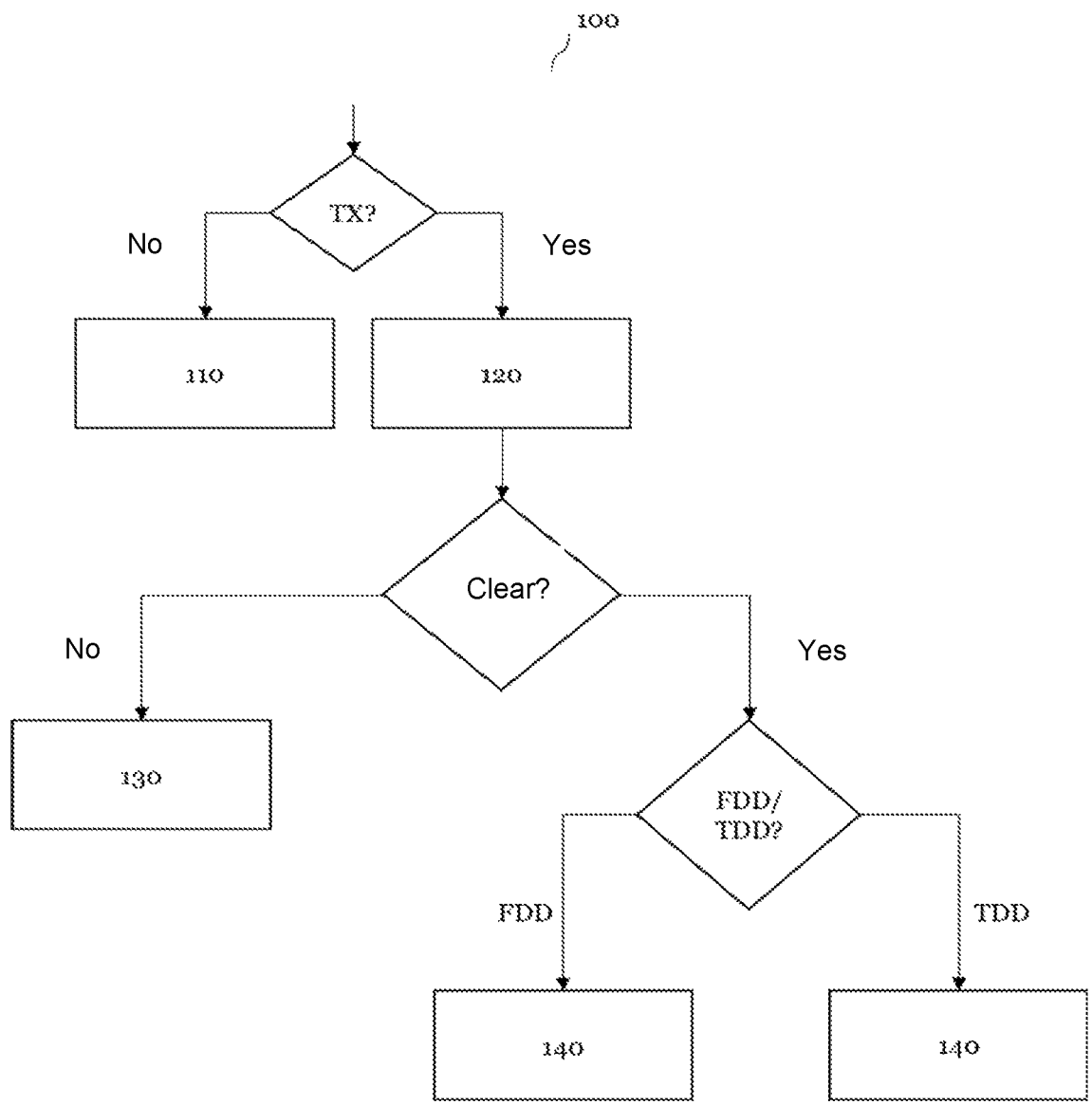
FIG. 1 depicts a flow chart of a method for operating a circuit arrangement for amplifying radio signals between a terminal device and an antenna according to one embodiment of the disclosure.
Figure 2:
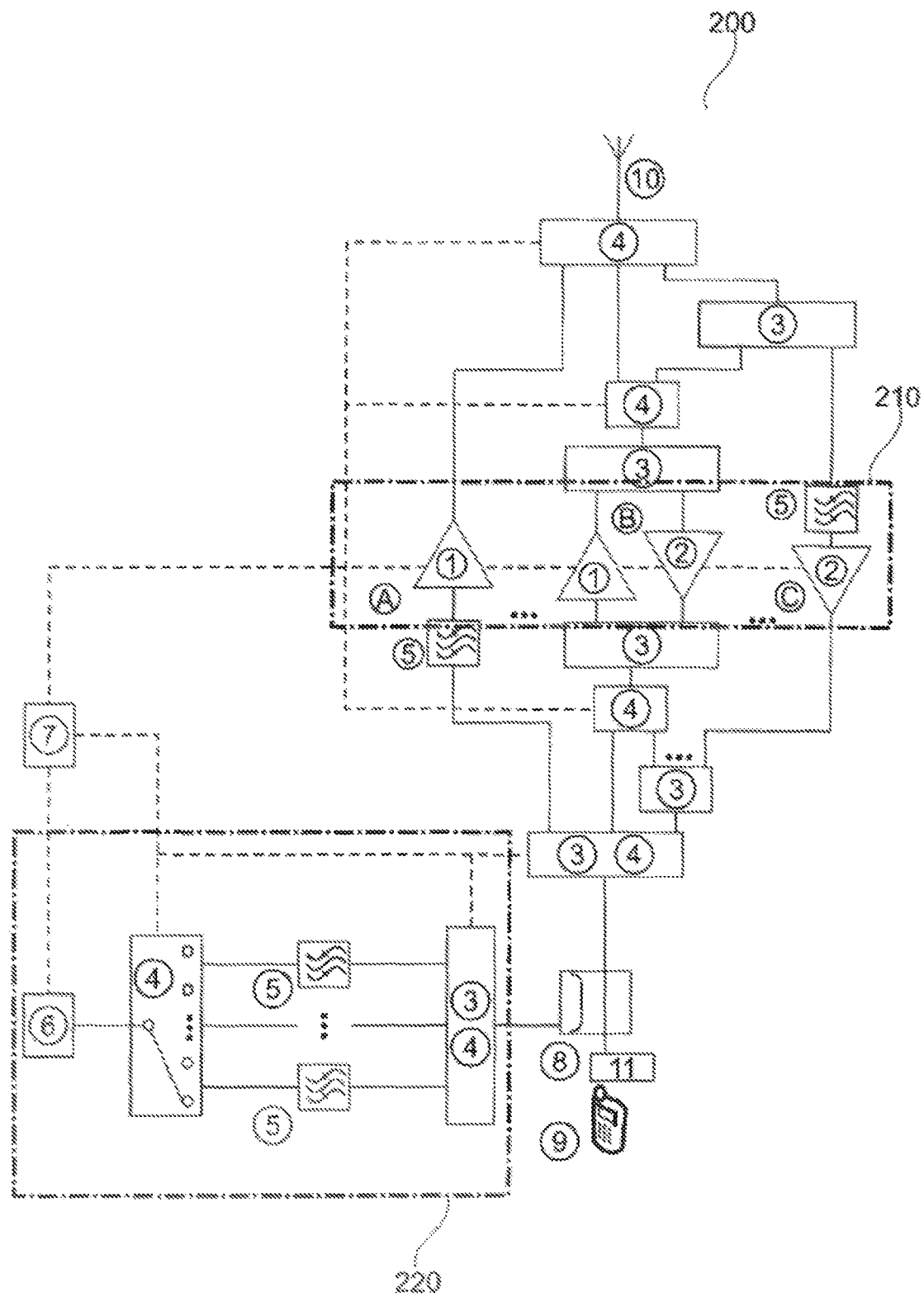
FIG. 2 depicts a circuit arrangement for amplifying radio signals between a terminal device and an antenna according to one embodiment of the disclosure.

FIG. 1 shows a flow chart of a method 100 for operating a circuit arrangement 200 for amplifying radio signals between a terminal device 9 and an antenna unit 10 in a first frequency band and in a second frequency band according to one embodiment of the disclosure. The corresponding circuit arrangement 200 is shown in FIG. 2 and is described in detail below.

Figure 4:
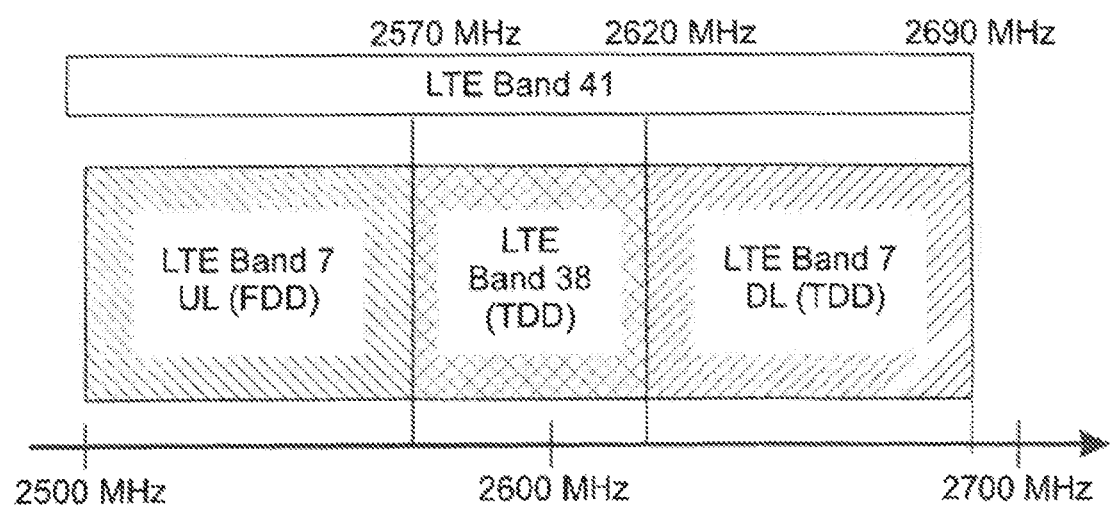
FIG. 4 depicts an example of several adjacent or overlapping frequency bands.

The first frequency band used in the method provides signal transmission according to a frequency division duplex (FDD) method, and the second frequency band provides signal transmission according to a time division duplex (TDD) method. As mentioned in the introduction, the application of the present method is particularly advantageous if the first and the second frequency bands are neighboring, and in particular adjacent or overlapping frequency bands in the frequency spectrum. An example of adjacent frequency bands are E UTRA bands 1 and 39, where band 1 is provided for FDD and band 39 is provided for TDD. Another example are E UTRA bands 7 (FDD) and 38 (TDD). As shown in FIG. 4, these two E UTRA bands directly adjoin one another.

Although two bands in the cited examples adjoin one another directly and in particular have at least theoretically no area of overlap, there is nevertheless a certain area of overlap which results from the bandpass filters used in each case. This technically resulting area of overlap of the two neighboring frequency bands depends, for example, on the edge steepness of the bandpass filters used. In the example of E UTRA bands 1 and 39, this area of overlap for common bandpass filters is, for example, about 40 MHz.

FIG. 4 also shows a band overlap in the example of E UTRA band 41, which extends from 2,496 MHz to 2,690 MHz and thus overlaps with E UTRA band 7 (FDD).

FIG. 1 first shows a differentiation as to whether a transmission signal is detected or not ("TX?"). According to the proposed method, in the absence ("No" case in the differentiation in FIG. 1) of a transmission signal in the circuit arrangement in both the first frequency band (FDD) and the second frequency band (TDD), activation 110 of amplification of received signals in the first and second frequency bands and thus amplification of both TDD and FDD received signals takes place. This amplification can be brought about, for example, by the FDD and TDD receiving amplifier paths of circuit arrangement 200 shown in FIG. 2 and identified by "B" and "C," wherein path "B" for the FDD frequency band has a transmission amplifier and a receiving amplifier, and the transmission amplifier path is deactivated in this case. Alternatively, it is possible that a receiving amplifier path configured for the amplification of both FDD and TDD received signals is provided in the circuit arrangement. In this case, it is decisive that in the absence of a transmission signal, the circuit arrangement is configured in such a way that only received signals are amplified.

As soon as a transmission signal is detected in the circuit arrangement ("Yes" case in the differentiation in FIG. 1), a check 120 of the detected transmission signal as to whether this signal can be unambiguously assigned to the first frequency band (FDD) or the second frequency band (TDD) is carried out in response thereto. This is shown in FIG. 1 as second differentiation ("Unambiguous?").

If the check 120 reveals that the detected transmission signal cannot be unambiguously assigned to the first frequency band or the second frequency band ("No" case of the corresponding differentiation in FIG. 1), activation of a first transmission amplifier path (FDD) for amplifying the transmission signal in the first FDD frequency band and activation of the first receiving amplifier path (FDD) for amplifying received signals in the first FDD frequency band take place in step 130. Thus, the entire FDD duplex path "B" for supporting the FDD band (first frequency band) is activated. Preferably, the second transmission amplifier path, i.e., the TDD transmission amplifier path, is simultaneously deactivated in order to ensure that only the amplifier paths for the FDD frequency band are active. In this way, a disturbance, for example due to interferences between TDD and FDD transmission amplifier paths, is avoided. If the currently detected transmission signal is a TDD transmission signal, this signal is likewise supported and amplified by activating the first transmission amplifier path for amplifying the FDD band.

"Activating an amplifier path" means that the amplifier path is switched in such a way that it can amplify the signals of the corresponding band. The respective transmission amplifiers 1 or receiving amplifiers 2 must be correspondingly energized. However, this does not mean that the respective amplifiers must be de-energized in states other than "activated."

According to the disclosure, the check 120 as to whether the detected transmission signal can be unambiguously assigned to the first FDD frequency band or the second TDD frequency band, i.e., whether the signal is unambiguously an FDD or a TDD signal, includes determining whether a detected signal level in one of the frequency bands is above a predetermined threshold value, and/or whether the detected signal level in one of the frequency bands is above the detected signal level in the other frequency band by a predetermined value.

Figure 3:
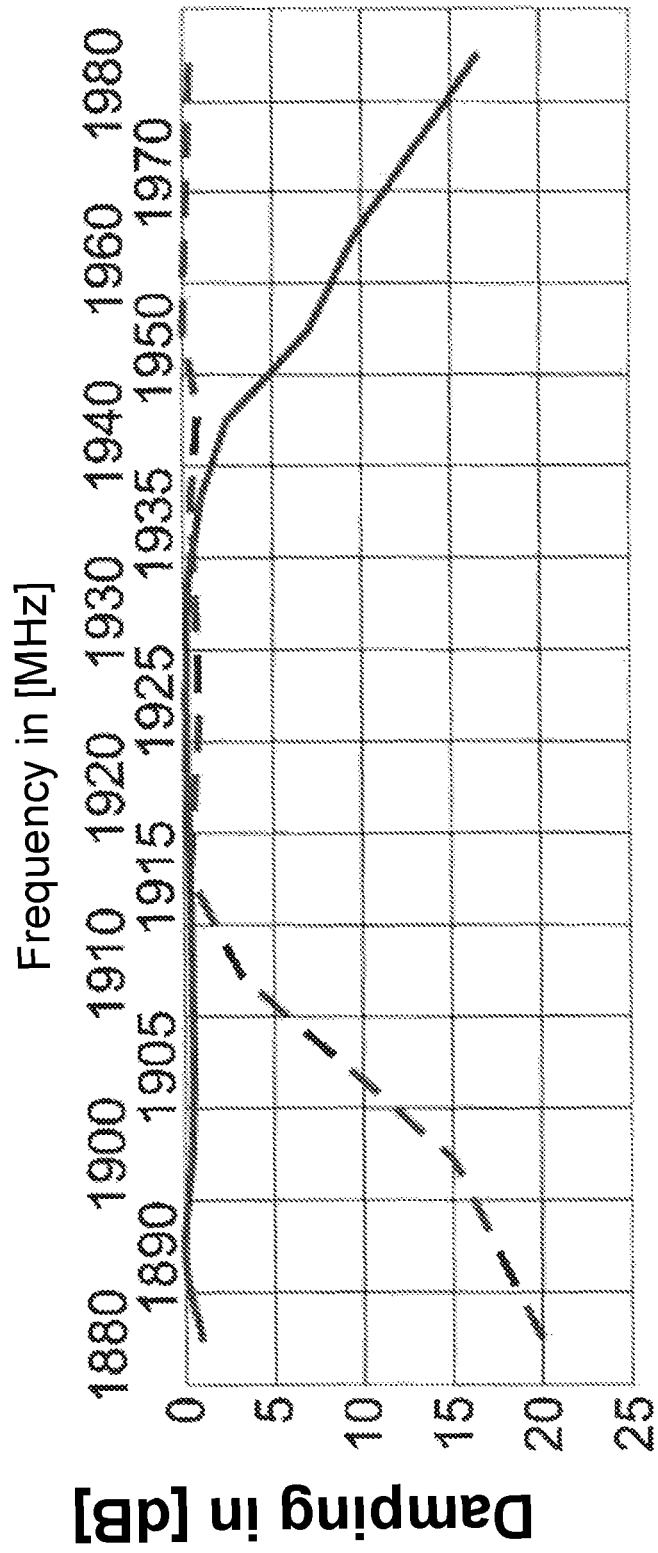
FIG. 3 depicts an example of a transmission function for a band overlap of two frequency bands.

FIG. 3 shows an exemplary illustration of the transmission function of the bandpass filters in the area of overlap for the aforementioned E UTRA bands 1 and 39. On the horizontal axis, the frequency range from 1880 to 1980 MHz is plotted. E UTRA band 39 (TDD) begins at 1880 MHz and ends at 1920 MHz. E UTRA band 1 (FDD) begins at 1920 MHz and ends at 1980 MHz. The transmission behavior, which can be measured in the power detector as a power difference, is plotted on the vertical axis of the diagram shown in FIG. 3. As a distinguishing criterion for whether a signal detected in these bands is an FDD or a TDD signal, a measurable power difference of the detected signal in the adjacent bands is assumed. The spectral bandwidth in which this power can be measured depends in particular on the edge steepness of the bandpass filters used. A power difference of, for example, 6 dB results in the aforementioned area of overlap between the two bands of approximately 40 MHz shown in FIG. 3, in which range an unambiguous assignment of a signal to one of the two bands is not possible solely on the basis of the measured signal level. This power difference of 6 dB corresponds to the aforementioned predetermined threshold value with respect to the detected signal level in one of the two frequency bands. The value of 6 dB is exemplary and depends in particular on an expected signal form, detectors used, and a measurement resolution of the control unit 7.

In the other case in which the check 120 reveals that the detected transmission signal can be unambiguously assigned to the first frequency band or the second frequency band ("Yes" case of the corresponding differentiation in FIG. 1), a further differentiation ("FDD/TDD" in FIG. 1) takes place as to whether the signal is an FDD or a TDD signal. Consequently, in step 140, the first transmission amplifier path (FDD) is activated if the detected transmission signal can be assigned to the first frequency band (FDD). If the detected transmission signal can be assigned to the second frequency band (TDD), the second transmission amplifier path (TDD) is activated in step 140. At the same time, the other transmission amplifier path is deactivated in order to avoid mutual interference of the transmission amplifiers and at the same time reduce the energy requirement of the circuit arrangement.

In addition to the aforementioned signal level-based determination of the frequency band used in each case, a time duration and/or a period duration during which the detected transmission signal is present is measured in some embodiments. The term "time duration" refers to a duration during which an uplink signal or transmission signal is transmitted by the terminal device without interruption. The term "period duration" refers to a duration during which an uplink signal repeats periodically. In the LTE-TDD standard, this is also called "downlink to uplink switch point periodicity." In addition to the aforementioned signal level-based determination of the respectively used frequency band, the time behavior of the transmission signal is thus analyzed in some embodiments on the basis of the transmission duration and/or the periodic repetition of transmission signals.

Based on the time duration and/or the period duration of the transmission signal, a check is carried out as to whether the transmission signal can be unambiguously assigned to the first frequency band or the second frequency band. If this is the case, the corresponding transmission and/or receiving amplifier path is/are activated.

For example, if the time duration of the transmission signal exceeds a predetermined duration threshold, the first transmission and receiving amplifier paths, i.e., the FDD amplifier paths, are activated since the signal cannot be a TDD signal in such a case. The duration threshold value in this respect results from the time durations defined for corresponding transmission signals in the respective telecommunication standard. According to the standards, a TDD time frame has, for example, a period duration of 5 ms or 10 ms (LTE-TDD) or 5 ms (TD-SCDMA). Depending on the configuration of the time slots for transmitting and receiving, a maximum time for transmission in the uplink of approximately TTD-SCDMA ≈4.2 ms and TLTE-TDD≈3.2 ms thus results. For the detection of an FDD band, an active signal preferably has to be present longer than the maximum permissible duration of an uplink signal for the TDD band. In the case of the standards LTE-TDD and TD-SCDMA, it is therefore necessary for a signal to be detected longer than 4.2 ms in order to clearly recognize it as an FDD signal. This value corresponds to the aforementioned duration threshold.

In order to determine the respective frequency band, a portion of the detected transmission signal is coupled out and transmitted to a detector unit 220. A signal recognized by the detector unit 220 is supplied for further processing to a control unit 7 configured to control (i.e., activate and deactivate) the transmission and receiving amplifier paths 1, 2.

FIG. 2 shows a circuit arrangement 200 for amplifying radio signals between a terminal device 9 and an antenna unit 10 in a first frequency band and in a second frequency band according to an embodiment of the disclosure, comprising means for carrying out the method described above.

Preferably with the aid of a transmission unit 11, the circuit arrangement 200 receives the transmission signals of the terminal device 9 for line-based further processing by means of the circuit arrangement 200, and transmits the received signals of the antenna unit 10 to the terminal device 9 after further processing by the circuit arrangement 200. However, the transmission unit 11 is not necessarily part of the circuit arrangement. In the transmission signal direction, the transmission unit 11 is followed by the coupler 8 which serves to divide the transmission signal of the terminal device 9 into (at least) a first signal portion and a second signal portion, and to supply the first signal portion to the transmission signal power detector 6 and the second signal portion to the amplification unit 210.

FIG. 2 further illustrates transmission and/or receiving amplifier paths A, B, C. Each amplifier path is configured to amplify one of the frequency bands. Amplifier path B is, for example, the aforementioned FDD duplex path for supporting the FDD band and comprises one transmission and receiving amplifier path each. Amplifier path A is a transmission amplifier path for the TDD band, and amplifier path C lastly is a corresponding receiving amplifier path for the TDD band. Each of the transmission amplifier paths A, B comprises a transmission amplifier 1, and each of the receiving amplifier paths B, C comprises a receiving amplifier 2.

Received and transmission signals of the terminal device 9 and the antenna unit 10 are separated from one another via diplexer(s) 3, couplers (not shown in FIG. 2), and/or high-frequency switches 4. The transmission signal of the terminal device 9 is routed from a coupler 8 to a detector unit 220 comprising one or more diplexers 3, high-frequency switches 4, couplers (not shown in FIG. 2), a plurality of bandpass filters 5, and a detector 6. The detector unit 220 comprises at least one corresponding first and second detector path for the first frequency band and the second frequency band, each detector path comprising one or more bandpass filters 5 configured to filter signals in the respective frequency band. The control unit 7 coupled to the detector 6 is configured to evaluate the signals supplied thereto by the detector 6 and to correspondingly control (i.e., activate and deactivate) the transmission and receiving amplifiers 1, 2 according to the above-described method. Controlling is thus based on the signals supplied to it by the detector 6.

Figure 5:
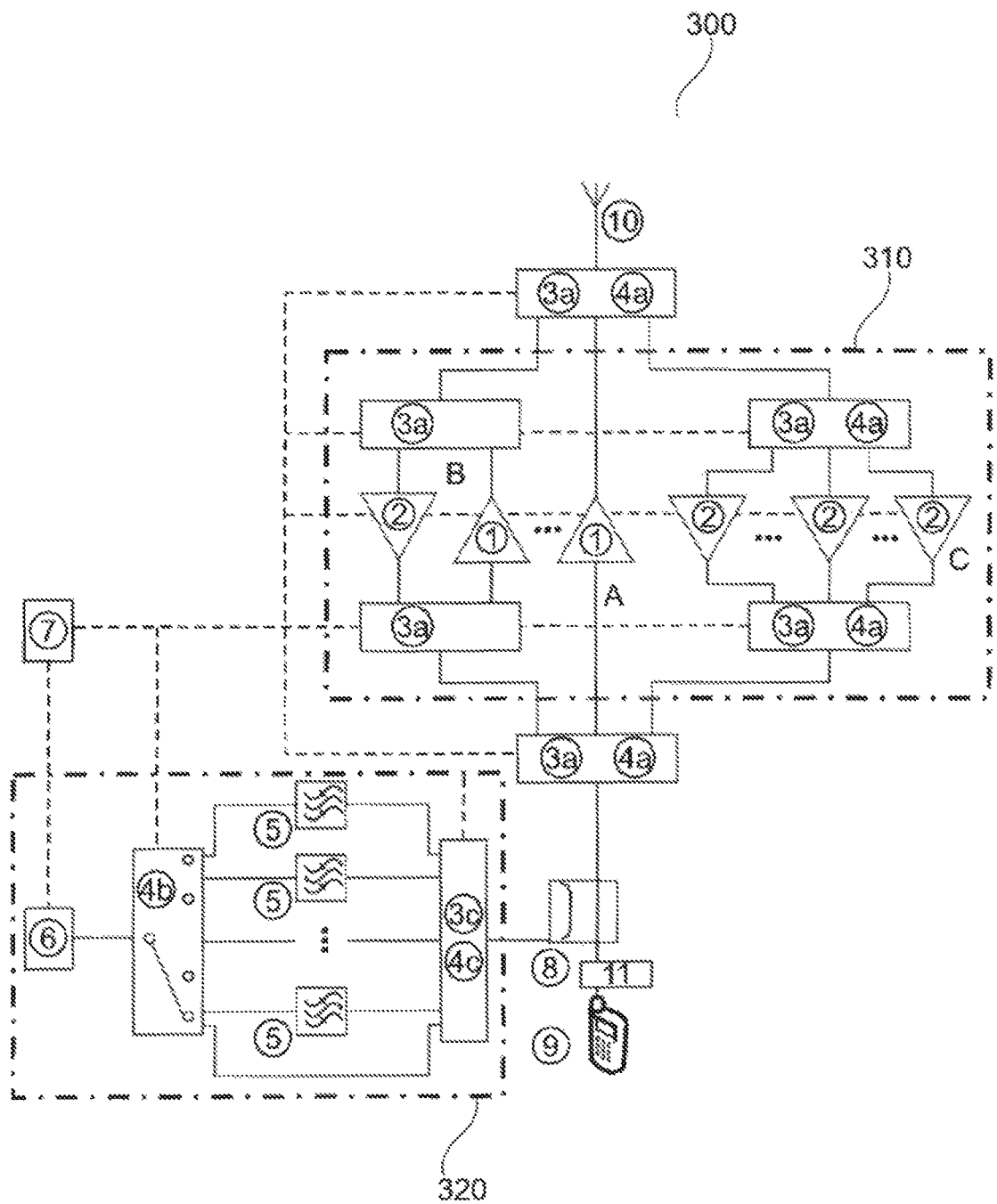
FIG. 5 depicts a circuit arrangement for amplifying radio signals between a terminal device and an antenna according to another embodiment of the disclosure.

FIG. 5 shows a corresponding circuit arrangement 300 comprising an amplification unit 310 which has a plurality of receiving amplifier paths C each having a receiving amplifier 2 in comparison to the amplification unit 210 of the circuit arrangement 200 shown in FIG. 2. The detector unit 320 of the circuit arrangement 300 correspondingly has a plurality of bandpass filters 5 and thus a plurality of detector paths. The further components, such as diplexers 3, high-frequency switches 4, and/or couplers for dividing the transmission and receiving signals before amplification by the respective amplifier paths are correspondingly adapted in the circuit arrangement 300 shown in FIG. 5. FIG. 5 illustrates that the circuit arrangement according to the disclosure and the corresponding method are arbitrarily scalable with regard to the number of frequency bands and corresponding amplifier paths. In particular, more than two frequency bands can also be processed, and any number of amplifier paths with a corresponding number of amplifiers can be used.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A method for operating a circuit arrangement for amplifying radio signals between a terminal device and an antenna in a first frequency band and in a second frequency band, the first frequency band providing signal transmission according to a frequency division duplex (FDD) method, and the second frequency band providing signal transmission according to a time division duplex (TDD) method, comprising:

activating amplification of received signals in the first and second frequency bands in the absence of a transmission signal in the circuit arrangement in both the first frequency band and the second frequency band; and in response to detecting a transmission signal in the circuit arrangement:

checking the detected transmission signal as to whether the detected transmission signal can be unambiguously assigned to the first frequency band or the second frequency band; and if the check reveals that the detected transmission signal cannot be unambiguously assigned to the first frequency band or the second frequency band, activating a first transmission amplifier path for amplifying the transmission signal in the first frequency band, and activating a first receiving amplifier path for amplifying received signals in the first frequency band.

2. The method of claim 1, wherein in the event that the check reveals that the detected transmission signal cannot be unambiguously assigned to the first frequency band or the second frequency band, a second transmission amplifier path for amplifying the transmission signal in the second frequency band is deactivated.

3. The method of claim 2, wherein the first and second frequency bands are adjacent or overlapping frequency bands of the mobile radio network.

4. The method of claim 3, wherein the check as to whether the detected transmission signal can be unambiguously assigned to the first frequency band or the second frequency band includes determining whether a detected signal level in one of the frequency bands is above a predetermined threshold value, and/or whether the detected signal level in one of the frequency bands is above the detected signal level in the other frequency band by a predetermined value.

5. The method of claim 1, further comprising: if the check reveals that the detected transmission signal can be unambiguously assigned to the first frequency band or the second frequency band:

activating either the first transmission amplifier path or the second transmission amplifier path, and deactivating the other transmission amplifier path.

6. The method of claim 1, wherein if the transmission signal can be unambiguously assigned to the first frequency band or the second frequency band based on a time duration and/or a period duration of the transmission signal, the corresponding transmission and/or receiving amplifier path is/are activated.

7. The method of claim 6, wherein if a time duration of the transmission signal exceeds a predetermined duration threshold, the first transmission and receiving amplifier paths are activated.

8. The method of claim 1, wherein each of the transmission amplifier paths contains at least one transmission amplifier, and/or wherein each of the receiving amplifier paths contains at least one receiving amplifier.

9. The method of claim 1, wherein a portion of the detected transmission signal is coupled out and transmitted to a detector unit.

10. The method of claim 9, wherein a signal recognized by the detector unit is supplied to a control unit.

11. The method of claim 9, wherein the detector unit provides, at least for the first frequency band and the second frequency band, a corresponding first and a corresponding second detector path, each detector path comprising one or more bandpass filters configured to filter signals in the respective frequency band.

12. The method of claim 1, wherein the transmission signals are transmitted by a user terminal device, and wherein the received signals are received by an antenna unit.

13. The method of claim 1, wherein the transmission signals and the received signals are divided by one of a diplexer, a coupler, or a switch before amplification by a respective amplifier path.

* * * * *